Dec. 4, 1945.  J. D. AKERMAN ET AL  2,390,233
SEALED AVIATOR'S SUIT AND HELMET AND MEANS FOR CONTROLLING
GAS PRESSURE AND OXYGEN DELIVERY THEREIN
Filed Dec. 17, 1941  4 Sheets-Sheet 3
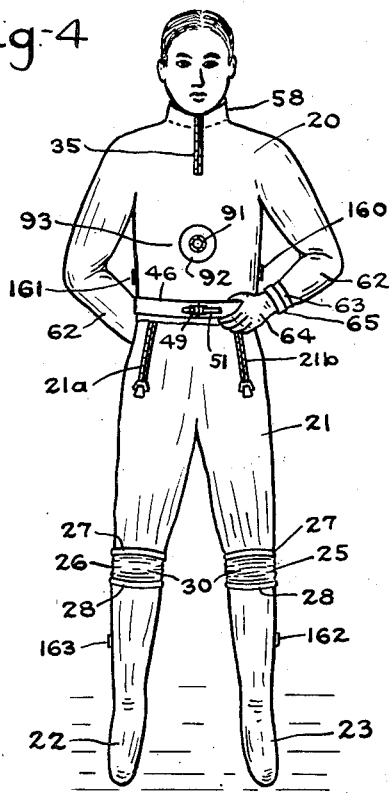
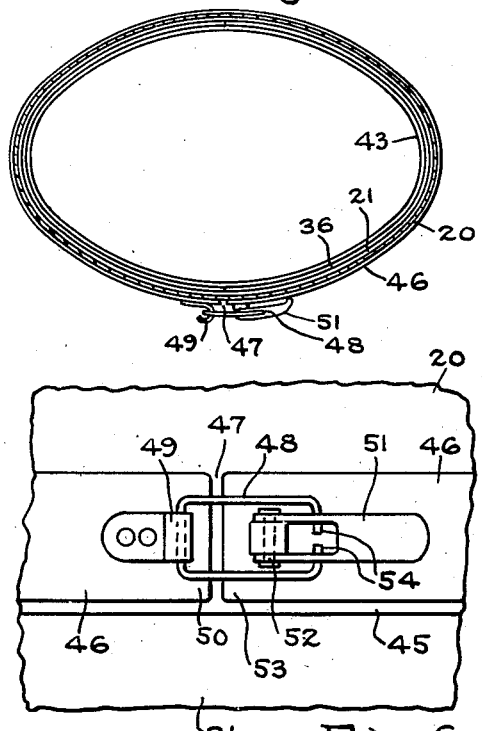
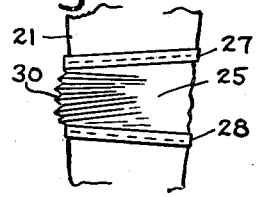
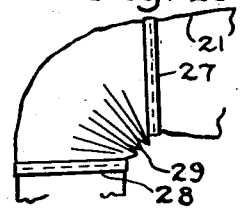
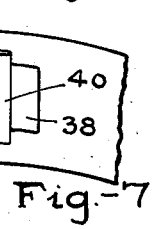
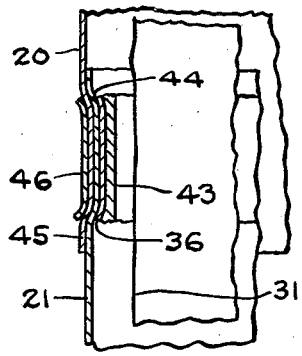
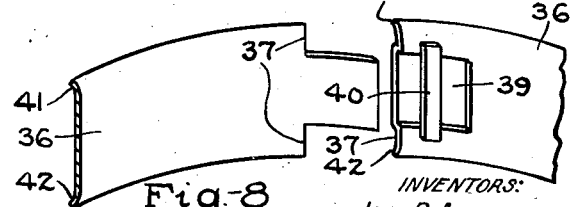
INVENTORS:
JOHN D. AKERMAN
WALTER M. BOOTHBY
ARTHUR H. BULBULIAN
WILLIAM R. LOVELICE II
By H. A. Whiteley
Attorney.

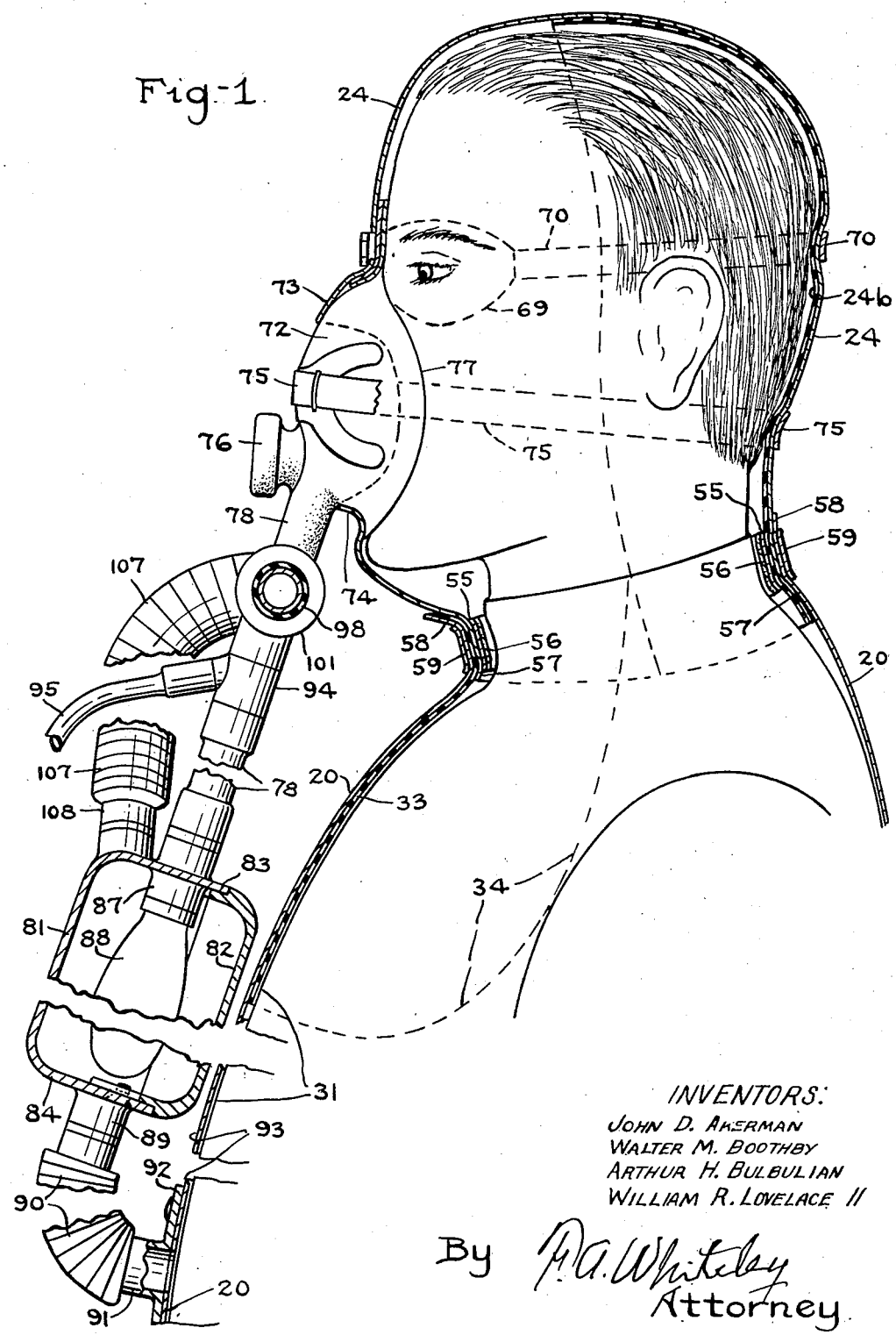

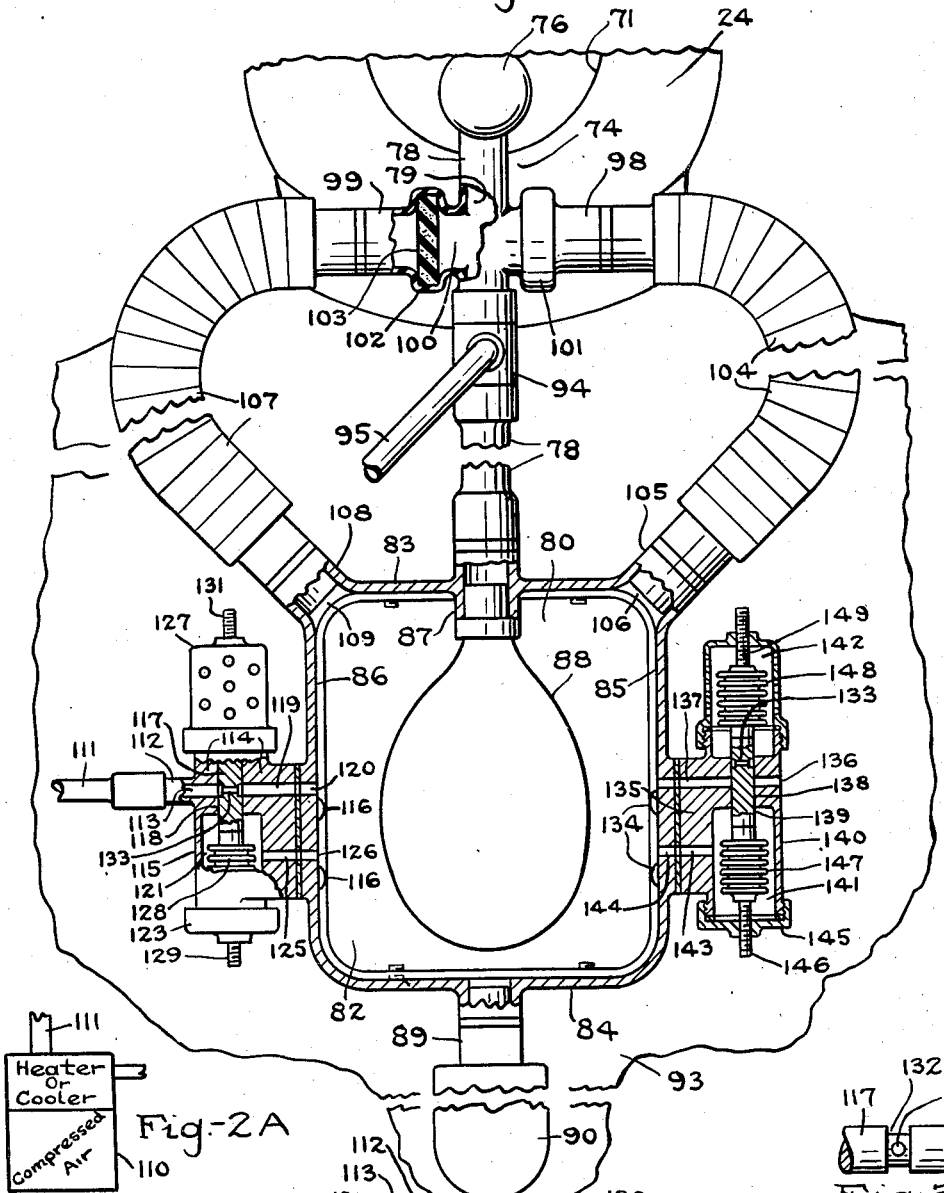

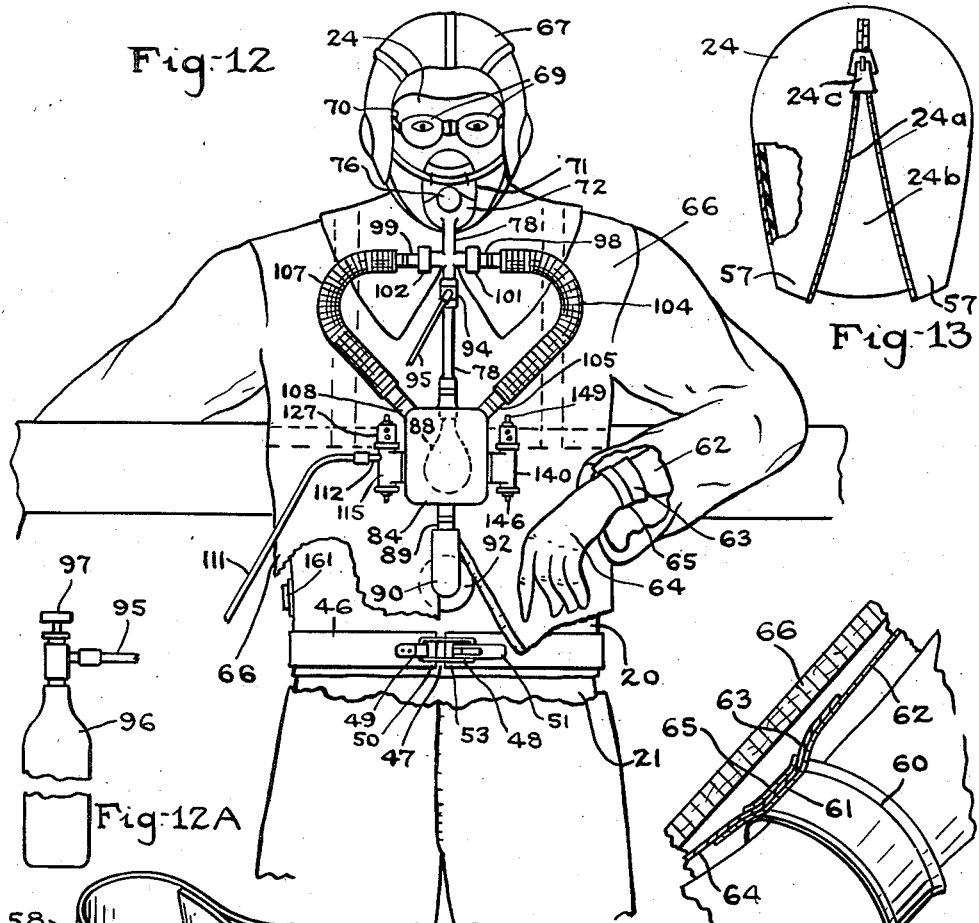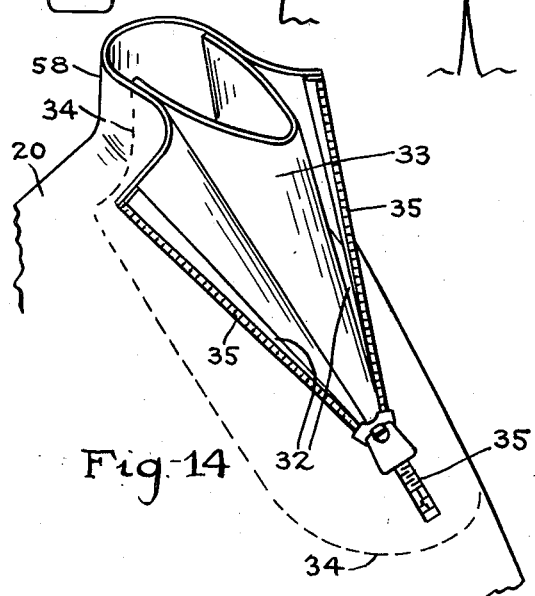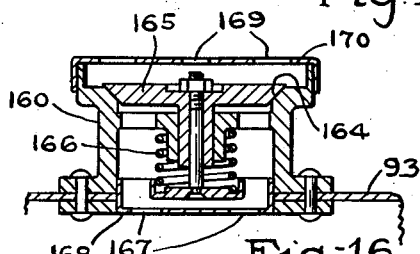

Patented Dec. 4, 1945

2,390,233

UNITED STATES PATENT OFFICE 2,390,233

SEALED AVIATOR'S SUIT AND HELMET AND MEANS FOR CONTROLLING GAS PRESSURE AND OXYGEN DELIVERY THEREIN

John D. Akerman, Minneapolis, and Walter M. Boothby, Arthur H. Bulbulian, and William R. Lovelace, II, Rochester, Minn.

Application December 17, 1941, Serial No. 423,400

5 Claims. (Cl. 128—144)

Our invention relates to a sealed aviator's suit and helmet and means for controlling gas pressure and oxygen delivery therein, and consists primarily in providing an enclosing suit of flexible material, including coverings for feet and a helmet for the head, all sealed gas-tight as worn, in combination with means for maintaining a gas pressure within the suit at a relatively constant higher pressure than that of the surrounding atmosphere, to provide means for supplying oxygen and rebreathing the same such that the escape of the gases of exhalation will be first into and then from the said sealed suit, and to provide means for additionally introducing air under pressure into the suit and means subject to the pressure of external atmosphere for determining a pressure within the suit substantially greater than that of the surrounding atmosphere.

In aviation, particularly in military aviation, higher and higher altitudes are constantly being reached where the initiative in combat will ordinarily go to the airplanes which can maneuver above the highest possible elevations of the airplanes which they are attacking. The maximum height or ceiling of airplane flight is continually being increased. Even at 15,000 feet it is regarded as necessary to provide added oxygen and to maintain a suitable gas pressure in the alveolar regions of the lungs, and when elevations in excess of 30,000 feet are obtained grave difficulties in connection with maintaining favorable life conditions of the aviator are encountered. We have discovered that not only must oxygen at suitable lung pressure be provided, but that more favorable results are generally attained by enclosing the entire body of the aviator in an enveloping flexible case in which is maintained a pressure considerably higher than the pressure of the surrounding atmosphere. Various different higher pressures are available and effective and within the scope of our invention, but we have found in practice that a differential higher pressure of in the neighborhood of 1½ lbs. per square inch within the sealing envelope is effective and satisfactory.

It is an object of our invention, therefore, to provide a flexible air-tight suit adapted to be placed upon the body of a wearer, preferably immediately over an undergarment such as a substantially skin-tight union suit, and having a helmet-like portion enclosing the head, foot portions enclosing the feet, and gloves enclosing the hands, all united together so as definitely to seal against ingress of air from without or egress of air from within.

It is a further object of our invention to construct the aforesaid suit in parts such, for example, as a coat part, and trousers part including attached feet, a helmet part and gloves, in combination with means for securing them together insuchwise that the connecting margins will be held air-tight throughout and all parts of the suit except at said connecting margins will be held covering all parts of the body of the wearer in substantially skin tight relation to the parts of the body covered by said parts of the suit.

It is a further object of our invention to form said securing means of rigid backing members such as may go around the waist, the neck and the wrists and leave free spaces about them in combination with members caused to grip the backing members and thereby not only to hold them with the parts connected together but effect sealing at the points of union.

It is a further object of our invention to construct the several pieces of the suit itself and the helmet with zipper openings backed by sealed-in elastic portions which can be stretched so that at the same time the parts of the device may be assembled on the body conveniently and easily and when assembled and secured together they will be sealed gas-tight from outside atmosphere.

It is a further and highly important object of our invention to provide a mask structure for overlying the nose and mouth of the aviator having its marginal portions extended within the chamber inside of the helmet and sealing against the face and yet being subject at the sealing edges to the gas pressure within the helmet and the sealed suit, and for supplying oxygen to the breathing chamber of the mask by known means such as direct continuous flow or intermittent demand type flow.

It is a further object of our invention to provide in connection with the mask structure a breathing passageway for both exhaling and inhaling having a direct open connection with a rebreathing bag and having laterally disposed restriction valves and connections from the restrictions valves ultimately to within the suit whereby exhalation will first fill the rebreathing bag and then exhaust into the suit and inhalation will first collapse the rebreathing bag and then draw air from within the suit.

It is a further object of our invention to provide means for supplying oxygen to the breathing passageway and mask, either by direct continuous flow of oxygen or by intermittent demand type feed, and the oxygen will preferably be fed into the breathing passageway at a point between it and the rebreathing bag or into the rebreathing bag itself so that the oxygen will be added to gases of exhalation to fill the rebreathing bag and will mix directly therewith upon inhalation.

It is a further object of our invention to house the rebreathing bag in a specially constructed chamber having connection with the outlets from the breathing tube past the restriction valves and also having connection with the interior of the air-sealed suit.

It is a further object of our invention to provide means for injecting air under pressure to the rebreathing bag chamber and thence into the space within the interior of the suit and to control the inlet of air to the rebreathing bag chamber and the interior of the suit by means of an automatic valve structure which in turn is subject to the atmospheric pressure at any elevation through the operation of a suitably attached aneroid structure.

It is a further object of our invention to employ for controlling outlet of air from within the suit a similar aneroid-controlled valve structure which is so adjusted relative to the compressed air inlet valve structure that it will require a predetermined amount of pressure in excess of that for opening the air inlet valve, for example, 1½ lbs. greater pressure, before the outlet valve mechanism will be opened.

It is a further object of our invention to have these valve structures formed with double aneroids, in each instance one of said aneroids being subject to the pressure of gas within the rebreathing bag chamber and the interior of the suit, and the other of said aneroids being subject to the pressure of outside atmosphere and to so adjust and balance these aneroids that the pressure of the gas within the rebreathing bag chamber and within the space inside of the suit will always have a pressure at a predetermined amount greater than the pressure of outside atmosphere, for example, will have a pressure greater by 1½ lbs. than the pressure of the outside atmosphere.

It is a further object of our invention to provide relief valves of common construction at several parts of the suit adapted to be opened by gas pressure within the suit somewhat in excess of the 1½ lbs. difference in pressure between the inside of the suit and the outside of the suit.

It is a further object of our invention to provide a structure at the knees of the trousers part of the garment which will permit flexing and bending of the knees without breaking the air seal to the inside of the garment.

The full objects and advantages of our invention will appear in connection with the detailed description thereof which will now be given in the appended specification, and the novel features by which the above identified mode of operation and advantageous results are obtained will be particularly pointed out in the claims.

In the drawings illustrating an application of our invention in one form:

Fig. 1 is a sectional elevation view taken on a line transversely across the center of a part of the suit and attached parts as worn.

Fig. 2 is a front elevation view of a portion of what is shown in Fig. 1 with some parts broken away and in section.

Fig. 2A is a diagrammatic view indicating a source of compressed air and means for heating it.

Fig. 3 is an enlarged sectional fragmentary view taken longitudinally of the inlet valve structure.

Fig. 3A is a fragmentary plan view of a part of the valve stem showing the annular groove and transverse hole running through it.

Fig. 4 is a front elevation view of an aviator showing the sealed air suit in the position which it will assume as worn.

Fig. 5 is a transverse sectional view showing the manner in which the parts of the suit, particularly the coat part and the trousers part, are secured together.

Fig. 6 is an external elevation fragmentary view showing the manner of clamping the split hoop upon the circumferential supporting base.

Fig. 7 shows how the parts of the supporting base are brought together when completely closed.

Fig. 8 shows the tongue and groove construction with overlying keeper for making this joint.

Figs. 9 and 10 are fragmentary detail views on an enlarged scale showing the knee structure of the suit to permit free flexing and bending of the knees while maintaining the sealed character of the suit.

Fig. 11 is an enlarged sectional elevation view of a part of the suit at the belt showing how the parts are secured together by the split band over the supporting band.

Fig. 12 is a perspective elevation view of a part of the suit and appurtenances as worn with some parts broken away and in section.

Fig. 12A is a fragmentary view indicating a source of oxygen to be delivered under controlled pressure.

Fig. 13 is a rear view of the helmet showing how the same may be put on and closed in operating position and the elastic sealing strap on the inside of it.

Fig. 14 is a perspective view of a portion of the coat part showing the manner of opening it to slip it over the head of a wearer and the rubber sealing strip associated therewith.

Fig. 15 is a fragmentary sectional view showing the manner of uniting the lower ends of the sleeves of the garment with the gloves worn by the aviator.

Fig. 16 is a sectional view of a check valve customarily employed in different parts of the suit.

As shown in Figs. 4 and 13 the suit proper comprises an upper or coat part 20 and trousers part 21 including feet 22 and 23, and a helmet 24, all of these parts being made of flexible material such as woven fabric treated to be gas tight, although the helmet, if desired, may be made of other types of material. The trousers part will normally include knee hinge portions 25 and 26 which, as shown in Figs. 9 and 10, comprise bands 27 and 28. It will be noted that the material between the bands is of excess length so that when the knee is flexed or bent there will be flaps or folds 29, Fig. 10, formed on the underside and when the leg is straightened at the knee, flaps or folds 30 will form at the front of the knee, Fig. 10. This arrangement is such that the space within the trousers legs at the knees will at all times be sealed air-tight while the wearer is permitted customary freedom of movement of the limbs.

The several parts of the suit above described are adapted to be put on and connected together in air-tight relation in the following manner. The trousers part 21 will normally be drawn on over the foot and legs in a customary manner. Zipper closed flaps 21a and 21b, Fig. 4, underlaid by a fold of the fabric of the trousers part 21 enable the waist to be expanded so that the trousers part can be drawn up over the hips. Preferably a suit of underwear indicated at 31, Fig. 11, such as an ordinary union suit with socks over the feet is worn next to the skin and the parts of the air sealed suit described herein will be drawn on over the union suit.

The coat part 20 will then be put on by being drawn down over the head. As shown in Fig. 14, this is provided with a flap opening 32 at its upper part which is backed by a rubber piece 33 indicated in extent by dotted lines at 34. This rubber piece is secured in gas-tight manner to the inside of the fabric coat portion and has sufficient elasticity to permit the same to be drawn on over the head of the wearer. It is closed by a zipper 35, Figs. 4 and 14, in a well known manner.

After the coat portion 20 and the trousers portion 21 are on the body of the wearer they are united at the waist in gas-tight relation in the following manner. A band 36 formed of some rigid material preferably light metal is split at 37, Figs. 7 and 8, and is adapted to be placed around the waist of the wearer and then put together so as to form a rigid ring-like or oval supporting member by inserting a tongue 38 in a groove 39 beneath a keeper 40, as clearly shown in Figs. 6 and 7. The band 36 has outwardly curved edges 41 and 42, as clearly shown in Figs. 7 and 8, and thus is adapted to be worn next to the body with no edges in a position to engage and irritate any part of the wearer's body. Also the inside of said band may have applied thereto a layer 43 of felt or similar material, as indicated in Fig. 11.

After the band 36 has been applied, an annular part 44 at the upper edge of the trousers is laid upon the outside of band 36 and a similar part 45 at the lower edge of the coat portion is laid upon the part 44 in overlapping relation as indicated in Fig. 11. A second band 46, preferably of flexible metal, is placed outside of the part 45. The band 46 is separated as indicated at 47 in Fig. 6, and is adapted to be drawn tight over the lapped parts 44 and 45 held between it and the first-named band 36 by means of a link 48 hingedly connected at 49 to one end 50 of band 46 and a lever 51 hingedly connected at 52 with the other end 53 of band 46 and connected intermediate its ends, as indicated at 54, with the link 48. By these means the band 46 is caused to clasp the overlapping parts 44 and 45 between it and the band 36 with very great force and hold the parts together so that leakage of air is definitely prevented.

The helmet 24, as shown in Fig. 1, is adapted to be applied over the head and in position to be united with the neck piece of the coat 20 by reason of an opening 24a down its back, Fig. 13. An inner piece of rubber 24b is secured in gas-tight relation to the inside of the fabric of helmet 24 and is adapted to be closed in a customary manner by a zipper 24c. The helmet 24 is secured to the coat 20 in substantially the same way. A split band 55 similar to the split band 36 preferably will have a lining 56 of felt or other protective material and when in position will form a base member surrounding, and suitably out of contact, with the neck. Upon the band 55 is laid the circumferential lower part 57 of the fabric of helmet 24 and overlapping it the upper part 58 of the coat part 20. Over this is laid a band 59 similar to the band 46 which is locked upon the overlapping parts 56 and 57 between the bands 55 and 59 by means, such as is shown in Fig. 6, applied to the belt supporting band 36.

Similarly at the sleeves a bracelet band 60 large enough to be slipped over the hand, Fig. 15, receives the lower circumferential part 61 of the sleeve 62 and overlapping it is the upper circumferential part 63 of the top of the glove 64. These overlapping parts are clamped together by means of band 65 in the same manner as heretofore described and shown in detail in Fig. 6. By these means the coat or upper portion 20, the trousers portion 21, the helmet 24 and the gloves 64, after being applied to the body are held together in an air-tight manner, so there is a chamber surrounding all parts of the body of the wearer which is sealed from outside air. As illustrated in Fig. 12, outer garments, such as a coat 66 and a protective helmet 67, may be donned by the wearer of the sealed suit outside the same. It will be noted that all parts of the suit when the same have been applied to the body of the wearer will be close fitting to the body, in fact almost skin tight, so as to conform the suit to the body of the wearer in its flexing movements and to reduce as much as possible the space within the suit surrounding all parts of the body of the wearer.

The mask 24 is provided with transparent eye pieces, or goggles, 69. The frame of these goggles has the fabric of the mask 24 cemented thereto and the goggles are held in position in conjunction with the front of the mask by means of a strap 70 which passes about the rear of the helmet. Protruded through an opening 71 in the helmet body is a mask structure 72 which engages the face of the wearer inside of helmet 20 and provides a breathing chamber enclosing the nose and mouth of the wearer. As indicated in Fig. 1, portions 73 and 74 of the fabric of helmet 20 overlie and are sealed in gas-tight relation to the mask body 72. The mask body is held in position in its relation to the helmet 24 by means of a strap 75 which passes around the nape of the neck of the wearer. The mask body 72, is, therefore, projected into the chamber formed within the body-enclosing suit and at its marginal contacts with the face of the wearer is subject to the gas pressure within said chamber.

It follows that if the seal of the mask body 72 against the face of the wearer at the marginal contacting portions 77, is at any time not perfectly sealed, or otherwise the breathing will be subject to the pressure of gas within the chamber enclosed with all parts of the body of the wearer in the breathing suit.

A microphone casing 76 is formed at the front of the mask body 72. As best shown in Figs. 1 and 2, a tube 78 leads from the lower part of the mask body 72 and forms a breathing passageway 79. This passageway 79 leads straight downward to a rebreathing bag chamber 80 formed by a box-like structure having front and rear walls 81 and 82, top and bottom walls 83 and 84 and side walls 85 and 86. Projecting into chamber 80 in line with the passageway 79 is a nipple 87 upon which is mounted a rebreathing bag 88. The rebreathing bag 88 is entirely within chamber 89 and opens directly by a relatively short path through passageway 79 to the breathing chamber within mask body 72. The exterior walls of rebreathing bag 88 will, therefore, always be subject to the pressure of gas in chamber 80. Opening through the bottom wall 84 of chamber 80 is a tube 89 which is connected with an elbow 90, in turn connected by a tube 91 and plate 92 formed therewith to the front fabric 93 of the coat portion 20 of the sealed suit. By this means the chamber 80 is at all times directly connected with the chamber inside of the sealed suit as the same is worn.

A nipple 94, Fig. 2, opens a passageway into the breathing passageway 79. This nipple is connected by means of a tube 95 with a suitable oxygen tank 96 having delivery control valves, not shown in detail, indicated generally at 97, Fig. 12A. This is one means of supplying oxygen to the breathing passageway 79, rebreathing bag 88 and the breathing chamber in mask 72. However the showing of Fig. 12A indicates any source of oxygen supply controlled in any well known way, such for example as by intermittent feed with demand type valve control.

As best shown in Fig. 2, the pipe 78 is provided with a pair of branches 98 and 99 extending in opposite directions and each opening into passageway 79 as indicated at 100 at a point above the entrance of oxygen delivery through tube 95 and nipple 94 into passageway 79. These passageways are provided with cylindrical enlargements 101, 102 in which are seated sponge rubber breathing restriction valves 103. From the extension 98 a tube 104 preferably of flexible corrugated rubber extends outwardly and downwardly and connects with an angularly disposed projecting tube 105 opening at 106 into the rebreathing-bag chamber 80 outside of rebreathing bag 88. Similarly the extension 99 is connected by a flexible corrugated rubber tube 107 with an angularly extended tube 108 which opens at 109 into rebreathing bag chamber 80. It will be apparent from the above that, upon exhalation the first part of the exhaled gases will go through the direct open passage to fill rebreathing bag 88, carrying along entering oxygen, and that as pressure builds up because of distention of rebreathing bag 88 the latter part of the exhalation, carrying most of the carbon dioxide, will pass through the restriction valves 103 and the tubes 104, 107 into the rebreathing-bag chamber 80 outside of rebreathing bag 88, and from there will go through passages in 89, 90 and 91 to the inside of the coat part of the sealed suit from which the exhalation gases may distribute throughout the chamber surrounding all parts of the wearer's body within the sealed suit. It further will be apparent that exhalation into the rebreathing bag 88 will always be subject to the pressure within rebreathing-bag chamber 80, which will be the same pressure as exists about the body of the wearer in the space within the suit. Inhalation also will be subject to the same pressure.

The above instrumentalities, including the mask 72 independently sealed upon the face of the aviator, the breathing tube 78, rebreathing bag 88 in enclosing box 81, laterally connecting tubes 104 and 107 and connection 90, 91 with the space inside of the coat part 20 of the flexible air-tight aviator's suit comprise a breathing system, in effect located entirely outside of the said aviator's suit, but having the rebreathing bag 88 and breathing tubes subject only to the pressure within the suit. This result is made certain because the walls of the breathing tubes and box 81 are all made to completely resist external pressure of the surrounding atmosphere so only the pressure from within the aviator's suit is communicated thereto through the passageways 89, 90 and 91. As heretofore stated, this pressure will be kept at a degree somewhat, say one and one-half pounds to the square inch, higher than the pressure of the surrounding atmosphere. In part this pressure is effected by exhalation from the breathing system, but more particularly and primarily it will be effected by injection of air into the space within the aviation suit by means entirely independent of the breathing system.

We have provided means for maintaining a pressure within the rebreathing bag chamber 80 and the interior of the suit which will be varied according to the pressure of the atmosphere outside of the suit, but which will always have a higher pressure in a fixed predetermined amount. This higher pressure preferably may be around 1½ lbs. per square inch. The means for accomplishing this predetermined variation of pressure consists in the employment of special valve constructions such as shown in Figs. 2 and 3, in association with means for injecting air under pressure into the rebreathing bag chamber 80 and thence within the sealed suit. In general the air may be taken from any source of compressed air, such as is indicated by diagram at 110, Fig. 2A, and preferably will be preheated or pre-cooled by any suitable means for that purpose. The pressure air will be conducted through a tube 111 to a nipple 112 having a bore 113 extending through a central block 114 formed across a valve casing 115. The block 114 and valve casing 115 is secured to the side 86 of the casing which encloses rebreathing bag chamber 80 by means of bolts 116, Fig. 2.

The bore opening 113 is blocked by a valve stem 117 extending longitudinally of a cylindrical valve bore 118. The bore 113 is in alinement with an extension 119 which in turn is in alinement with an opening 120 into the rebreathing bag chamber 80. The valve stem 117 extends through the block 114 into a chamber 121 at one end of the valve stem and into a chamber 122 at the other end of the valve stem. The chamber 121 is sealed from outside atmosphere by means of a closure cap 123 and gasket 124, as shown in Fig. 3, but from chamber 121 extends an opening 125 in alinement with an opening 126 extending through side wall 86 into chamber 80. The chamber 121, while sealed from outside atmosphere, is in communication with the atmosphere inside of rebreathing bag chamber 80 and within the sealed suit. The chamber 122 is closed by a perforated cap 127 so that it is, of course, subject to the pressure of the outside atmosphere.

Upon the end of valve stem 117 extending into chamber 121 is an expansible gas filled aneroid 128, which is thus made subject to the pressure of gas within rebreathing bag chamber 80 and within the space in the sealed suit about the body of the wearer. A set screw 129 forms an abutment for the end of aneroid 128 and is adapted to adjust the compression thereof as desired. Likewise connected with the other end within chamber 122 is a second aneroid 130 which engages the end of a set screw 131 and may have its degree of compression adjusted thereby.

The valve stem 117 is provided with an annular groove 132, Figs. 3 and 3A, and also preferably will have a hole 133 directly through it and normally having its length in the plane of holes 113 and 119. When these parts are in alinement, as appears in Fig. 2, it is obvious that air under pressure will be delivered directly into rebreathing-bag chamber 80 and thence to the interior of the sealed suit enclosing all parts of the body of the wearer. As the pressure rises in rebreathing bag chamber 80 it will be communicated through openings 125, 126 to valve chamber 121 and will tend to compress the aneroid 128 and move the valve stem 117 toward valve chamber 121 finally moving said valve stem over sufficiently so that the annular groove 132 and hole 133 will be taken away from openings 113, 119 to the position shown in Fig. 3, when introduction of pressure air into the rebreathing-bag chamber 80 and within the sealed suit will be terminated, except for such as is passed in by way of exhalation going through restriction valves 103 and tubular passageways 104 and 107.

The movement of valve stem 117 to the left will also tend to expand aneroid 130 in valve chamber 122 which is at atmospheric pressure. As the elevation grows higher and higher the air pressure in chamber 122 will drop which will cause the aneroid 130 to expand in such lowered pressure tending to assist the contraction of aneroid 128 due to pressure in valve chamber 121 and this will have the effect of compensating for the decreased pressure on the outside of the suit by correspondingly aiding in shutting off of further supply of air under pressure to the inside of the sealed suit.

Attached to the side wall 85 by means of bolts 134 is a compensating release valve structure in all respects similar to that heretofore described. The block 135 has therein apertures 136 and 137 which open into the connecting passageway 138 having therein the valve stem 139. The valve casing 140 is formed with a chamber 141 sealed from outside atmosphere and a chamber 142 open to outside atmosphere. Likewise chamber 141 is open through passageways 143 and 144 into rebreathing-bag chamber 80. The chamber 141 is closed and sealed by cap 145 which has threaded therein a thrust pin 146 engaging an aneroid 147 in chamber 141 and subject to the pressure of gas within rebreathing-bag chamber 80 and within the chamber in the sealed suit enclosing the body of the wearer. Chamber 142, open to atmospheric pressure, has therein an aneroid 148 which is engaged by thrust pin 149. By means of thrust pins 146 and 149, which are set screws, the proper adjustment of compression of the two aneroids is effected.

It follows that as pressure rises in chamber 141 due to introduction into the rebreathing-bag chamber and sealed suit of air under pressure from tube 111 the aneroid 147 will move annular groove 132 and hole 133 to the left to bring them into registry more or less with openings 136 and 137, thus permitting gas from rebreathing-bag chamber 80 and the sealed suit to waste to atmosphere and reducing the pressure within the same. The aneroid 148, as in the case of the aneroid 130, subject to atmospheric pressure, will compensate for reduced atmospheric pressure on the outside of the flexible suit by tending to move the openings through valve stem 139 in the same direction and thus requiring greater pressure inside tending to release more air from the rebreathing-bag chamber 80 and the sealed flexible suit as the elevation increases and the atmospheric pressure falls.

As additional safeguards for preventing too great rise of pressure within the sealed suit, or within parts thereof, as for example, in a sudden descent from higher to lower altitudes, or sudden flexures of parts of the body, we provide a series of relief valves 160, 161, 162 and 163 at the sides of the body portion and toward the bottoms of the leg portions of the sealed suit as shown in Fig. 4, or elsewhere as may be desired. Any suitable form of relief valve may be employed, such for example as that shown in Fig. 16, wherein a valve seat 164 is engaged by a valve disc 165 and is normally held in such engagement by a spring 166 so that when pressure of gas from within through openings 167 in an inner cap 168 is sufficient to overcome the force of the spring, gas will flow out through openings 169 in an outer cap 170.

The advantages of our invention will appear from the foregoing description. One highly important advantage is that the body of the aviator and all parts of it are within a sealed suit, which is flexible at all points except points of union of the parts of which the suit is made up, and which hence makes the chamber within the suit, and which contains all parts of the body of the wearer, subject to the pressure of the surrounding atmosphere, and at the same time is combined with means for adding air under pressure within said sealed chamber so controlled that that pressure will, at any and all elevations and consequent different pressures, have a fixed ratio of increased pressure above that of the surrounding atmosphere. The effect of this is that the aviator, no matter how high he may go and hence how low the atmospheric pressure may drop, always will have surrounding his body a gas pressure substantially in excess of the pressure of the outside atmosphere.

A further great advantage of our invention resides in the fact that this pressure, compensated in actual pounds per square inch for various elevations and atmospheric pressures, cannot rise above a predetermined amount related to the outside atmospheric pressure, so that the fabric of which the sealed suit is composed will always be protected against any possible rupturing forces or strains.

A further great advantage of our invention resides in the fact that the arrangement of rebreathing bag and waste passages in relation to the contact of mask with the face is such that breathing takes place under the external pressure fixed within the sealed suit and is never affected directly by the pressure of the surrounding atmosphere.

It is a further great advantage that the waste gases of exhalation go to the rebreathing-bag chamber and thence to the chamber within the sealed suit. Thus the warmth of the exhaled gases is conserved both for warming or maintaining warmth of the gases coming from the rebreathing bag and the oxygen mask therewith, and for carrying such warmth into the interior of the sealed suit about the body of the wearer, the relief valves 160, 161, 162 and 163 being so positioned as to tend to distribute this breathed-in air throughout the space within the sealed suit about the body of the wearer. And also exhalation and likewise inhalation will be subject to the pressures maintained in the sealed suit.

A fundamentally novel and important advantage of our invention resides in the controlled introduction of warmed or cooled air within the sealed suit about the body of the wearer whereby a suitable pressure within the sealed suit and upon the body of the wearer at all points thereof may be maintained regardless of variations in the pressures of the surrounding atmosphere which may result from variations in elevation. The control of this pressure in the sealed suit is made automatically such that the pressure never can become too great relative to the surrounding atmospheric pressure and yet always will be enough to provide satisfactory life conditions for the aviator. Thus the danger and ill effects of low pressures at high altitudes are almost entirely avoided, and ascent to higher elevations and into lower air pressures than has been practicable heretofore is made possible while the safety of the aviator and freedom from serious or dangerous effects of such low pressures is secured.

It is a further advantage of our invention to so construct the various parts of the sealed suit that it may be put on with comparative ease, and, even though composed of flexible material, can readily be secured in position by the wearer himself so as to be sealed gas-tight, excepting as to those valve openings which are designed for the introduction of air under pressure or the relief of such pressures when they become too excessive.

Another final and highly important advantage of our invention resides in the combined use of a sealed suit having therein air at a regulated pressure always a sufficient and predetermined degree higher than the pressure of the surrounding atmosphere with a separate and interconnected mask structure operating in much the same way that it would operate if used independently of the sealed suit, and yet also operating so that all of the breathing processes take place subject to the pressure maintained within the sealed suit at the desired degree higher than the pressure of the surrounding atmosphere.

We claim:

1. In association with a sealed flexible air-tight aviator's suit for use at high elevations, which covers and encloses a space sealed about the entire body of the wearer, a breathing system including a mask having its face-contacting margins within said space and sealed therefrom against the face of the wearer, a breathing line leading from said mask and terminating in a rebreathing bag, and a box enclosing the rebreathing bag and having connection with said space.

2. In association with a sealed flexible air-tight aviator's suit for use at high elevations, which covers and encloses a space sealed about the entire body of the wearer, a breathing system including a mask having its face-contacting margins within said space and sealed therefrom against the face of the wearer, a breathing line leading from said mask and terminating in a rebreathing bag, and a box enclosing the rebreathing bag and having connection with said space, a secondary breathing line leading from the first named breathing line to the interior of said box, and a sponge rubber restriction valve in said secondary line.

3. In association with a sealed flexible air-tight aviator's suit for use at high elevations, which covers and encloses a space sealed about the entire body of the wearer, a breathing system including a mask having its face-contacting margins within the space in said suit surrounding the body of the aviator, a breathing line leading from said mask and terminating in a rebreathing bag, a box enclosing the rebreathing bag and having connection with said space, a secondary breathing line leading from the upper part of the first named breathing line to the interior of said box, a sponge rubber restriction valve in said secondary line, and means for introducing oxygen to the first-named breathing line at a point below the opening therefrom of the secondary line.

4. In association with a sealed flexible air-tight aviator's suit for use at high elevations, which covers and encloses a space sealed about the entire body of the wearer, a breathing system including a mask having its face-contacting margins within said space and sealed therefrom against the face of the wearer, a breathing line leading from said mask and terminating in a rebreathing bag, a box enclosing the rebreathing bag and having connection with said space, a pair of secondary breathing lines leading in opposite directions from the first named breathing line and connected with the space within said box, and a sponge rubber restriction valve in each of said secondary lines.

5. In association with a sealed flexible air-tight aviator's suit for use at high elevations, which covers and encloses a space sealed about the entire body of the wearer, a breathing system including a mask having its face-contacting margins within said space and sealed therefrom against the face of the wearer, a breathing line leading from said mask and terminating in a rebreathing bag, a box enclosing the rebreathing bag and having connection with said space, a source of compressed air near the box having delivery connection therewith; and means for controlling introduction of said compressed air into said box and thence into said space.

JOHN D. AKERMAN.
WALTER M. BOOTHBY.
ARTHUR H. BULBULIAN.
WILLIAM R. LOVELACE, II.